(No Model.)
G. B. SIMONDS.
CHURN.
No. 344,999. Patented July 6, 1886.
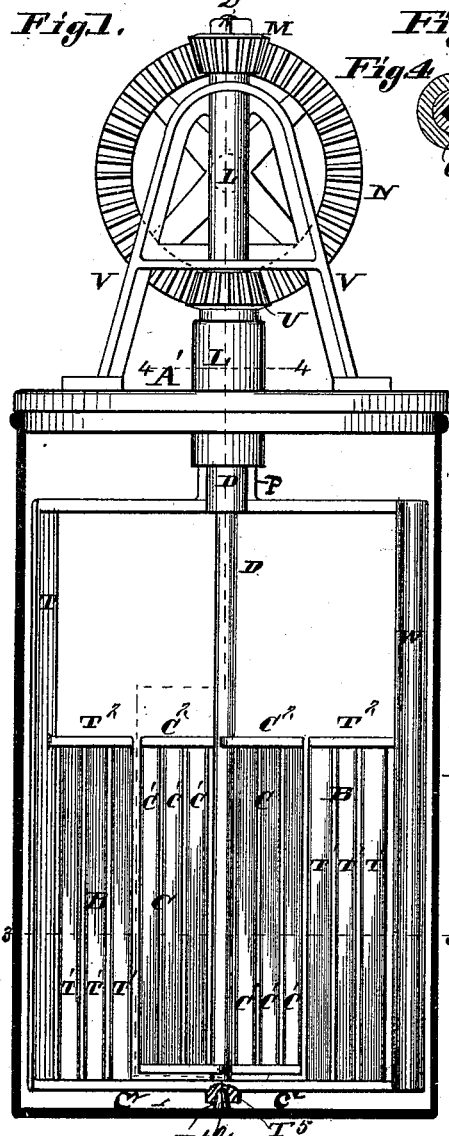
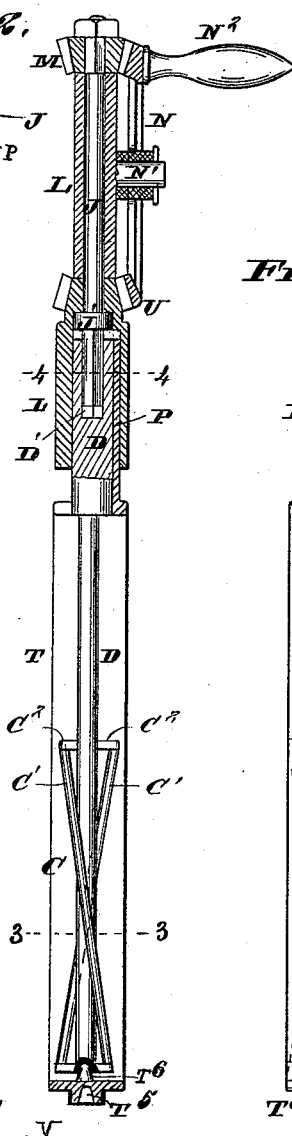
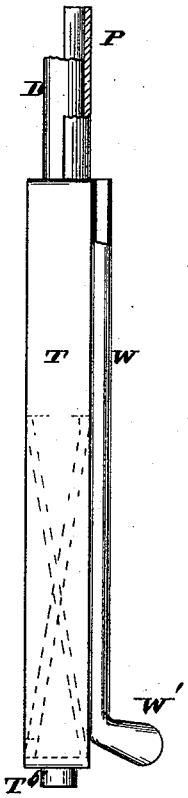
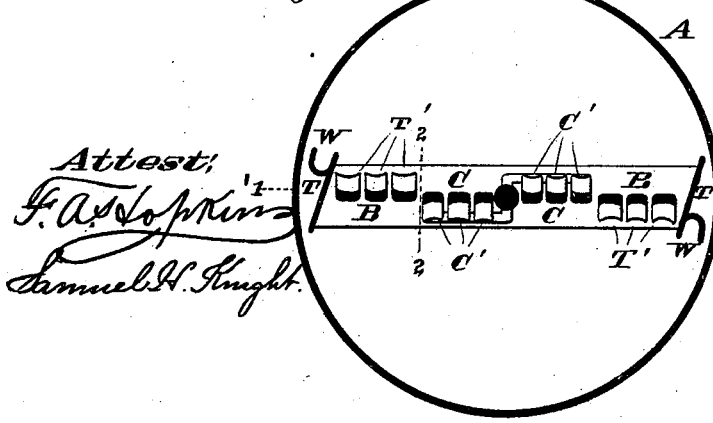
Attest:
F. A. Hopkins
Samuel H. Knight
Inventor:
Gustavus Bartlett Simonds
By Knight Bros
Attys.
N. PETERS, Photo-Lithographer, Washington, D. C.

UNITED STATES PATENT OFFICE.

GUSTAVUS BARTLETT SIMONDS, OF SEDALIA, MISSOURI.

CHURN.

SPECIFICATION forming part of Letters Patent No. 344,999, dated July 6, 1886.

Application filed August 26, 1885. Serial No. 175,390. (No model.)

*To all whom it may concern:*

Be it known that I, GUSTAVUS BARTLETT SIMONDS, of Sedalia, in the county of Pettis and State of Missouri, have invented a certain new and useful Improvement in Churns, &c., of which the following is a full, clear, and exact description, reference being had to the accompanying drawings, forming part of this specification, and in which—

Figure 1 is a view showing a vertical section of a vessel and my improved churning or beating device in elevation, the lower pivot-socket being in section. Fig. 2 is a view showing a vertical section of my churning device on the line 2 2, Figs. 1 and 3, showing a portion of the frame, rod, and an inner dasher in elevation. Fig. 3 is a view showing a horizontal section of a vessel and my churning device on the line 3 3, Figs. 1 and 2. Fig. 4 is a view showing a horizontal section of my churning device on the line 4 4, Figs. 1 and 2. Fig. 5 is a view showing a modified form of dasher air-tube, partly in section, the dasher-frame, the outer dasher indicated in dotted lines, the upper portion of the neck in section, and the dasher-rod broken off and omitted.

My invention relates to an improved machine intended more particularly for use as a churn, but which may also be used as an egg-beater; and my invention consists in features of novelty, hereinafter fully described, and pointed out in the claims.

Referring to the drawings, A represents a vessel that may be of any suitable shape or size, and provided with a cover, A'.

B represents an outer, and C an inner, dasher, arranged to revolve or turn in opposite directions. The inner dasher consists of bars or strips C', having longitudinally-grooved backs and connected at top and bottom to plates C², projecting from a shaft, D. The main bearing-pivot T⁴, engaging in socket T⁵, supports the outer dash-frame, which turns on it, and a second pivot, T⁶, attached to the said frame, stands in the same relation to the inner dash-frame.

The bars C' are preferably arranged in an inclined position, as shown in Figs. 2 and 3, to cause a more thorough agitation of the contents of the vessel.

The shaft D or rod is enlarged at its upper end, and has a non-circular socket, D', to receive the lower non-circular end of a spindle, J, that passes through a sleeve, L, supported by it, and on the upper end of this shaft is a pinion, M, into which meshes a cog-wheel, N, journaled to an arbor, N', projecting from the sleeve L, and which is provided with an operating-handle, N². The sleeve L is made in two parts, the lower part being enlarged and having an enlarged socket or opening that receives the upper enlarged end of the shaft D. This enlarged part of the shaft is circular in cross-section, as shown in Fig. 4; but the socket in this part of the sleeve is non-circular, having shoulders O, formed by making the socket larger on one half of the tube than the other half, and in this enlarged part of the socket fits a semicircular tube or neck, P, extending upward from the frame T of the outer dasher, B. The upper end of this lower part of the sleeve is provided with a pinion, U, meshing into the cog-wheel N.

It will now be understood that with this construction and arrangement of the parts the dashers will be made to revolve in opposite directions when the handle N² is turned, and the handle, with the gearing, can at any time be lifted from the dashers and without any trouble replaced. The gearing is connected to the cover A' of the vessel by a frame, V, through which the sleeve L passes. The spindle J has a collar, J', upon which the lower part of the sleeve L rests.

The outer dasher consists of the frame T and bars or strips T', secured to plates T², projecting from the frame. The strips T' have longitudinally-grooved backs, and are inclined in the opposite direction to those of the inner dasher on each side of the machine. (See Fig. 3.) The vessel A has a central projection or bearing-pivot, T⁴, at bottom, that fits in a socket, T⁵, in the bottom of the lower frame, and a second bearing-pivot secured in a central position on the bottom bar of said frame engages in a socket in the bottom of inner frame and forms its bearing.

W represents air-ducts on the outer surface of the vertical walls or parts of the frame T, the purpose of which is to cause a circulation of air down into the cream, as the dasher is turned, to expedite the churning process.

These ducts may consist of half-tubes, as shown in Figs. 1 and 3, or of whole tubes, with funnels W' at their lower ends, as shown in Fig. 5. With the half-tubes air-spaces will be left in the cream as the dasher is turned quickly, as will be plainly understood.

Y represents a thermometer, located in a case, Y', at one side of the vessel, to indicate the temperature of the cream. To this I make no claim as inventor.

The center or inner dasher is removable, and the outer dasher can be worked without it, which is a novel feature in the churn of great advantage after the cream breaks in gathering the butter.

I claim as my invention—

1. The combination of a frame, T, having air-ducts W at each side extending the height thereof, plates $T^2$, and bars T', having longitudinally-grooved backs and extending from the bottom plate of the frame to the plates, a vessel in which the frame is rotated, means for rotating the frame, and a cover supporting the means by which the frame is operated, substantially as set forth.

2. The combination of a frame, T, having air-ducts, W, at each side, dashers B, and neck P, the sleeve L, formed with an upper portion having arbor N', and a lower portion formed with semicircular recess for the neck, spindle J J', connecting the portions of the sleeve, pinion U, secured to the lower portion, and a cog-wheel, N, substantially as set forth.

3. The combination of the inner dasher secured to a vertical shaft, D, outer dasher formed upon a frame, T, semicircular neck P on the frame T, sleeve L, made in two parts, the lower part having a non-circular socket to fit over the upper end of the shaft D and neck P, spindle J, extending through the upper part of the sleeve and having a non-circular lower end fitting in a socket in the upper end of the shaft D, pinions on the spindle and lower part of the sleeve, and cog-wheel journaled upon an arbor projecting from the upper part of the sleeve and meshing into the pinions, substantially as shown and described.

4. The combination of the inner dasher consisting of inclined bars C', having longitudinally-grooved backs and secured to a shaft by plates $C^2$, outer dasher consisting of inclined bars having longitudinally-grooved backs and secured to a frame, T, and mechanism for turning the dashers in opposite directions, as set forth.

GUSTAVUS BARTLETT SIMONDS.

In presence of—
BENJN. A. KNIGHT,
JOSEPH WAHLE.